June 1, 1971 W. FREEMAN 3,581,381
METHOD OF FORMING A THREADED TUBE
Filed April 10, 1968
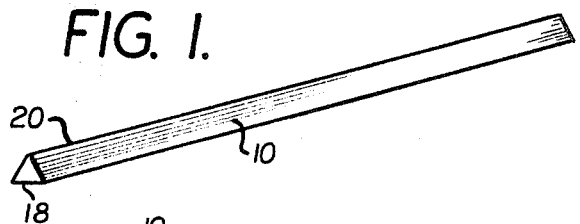
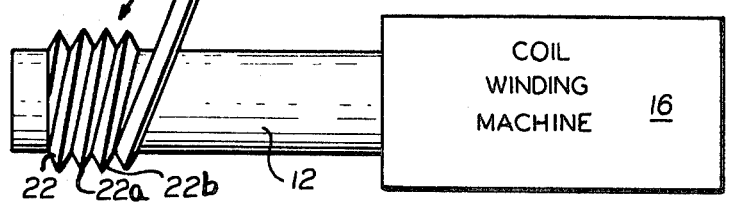
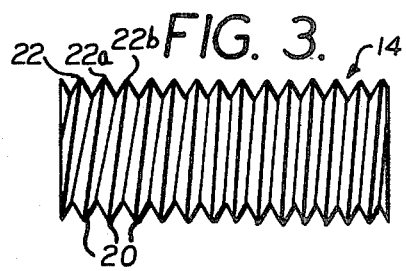
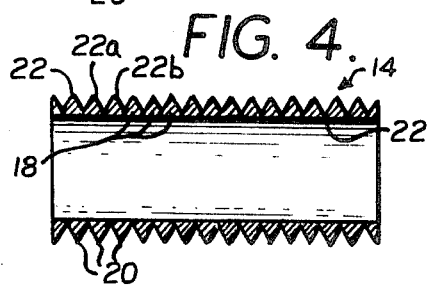
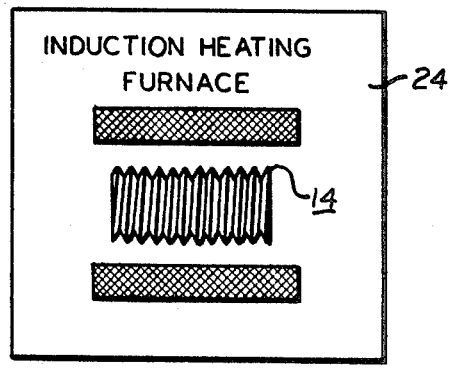
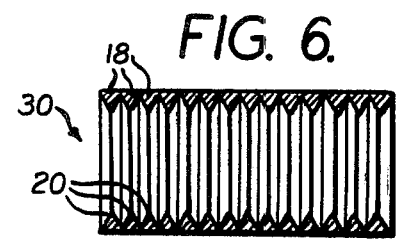
INVENTOR
WALTER FREEMAN
BY *Hubbell, Cohen + Stiefel*
ATTORNEYS.

United States Patent Office 3,581,381
Patented June 1, 1971

3,581,381
METHOD OF FORMING A THREADED TUBE
Walter Freeman, 155 W. 68th St., Apt. 230,
New York, N.Y. 10023
Filed Apr. 10, 1968, Ser. No. 720,216
Int. Cl. B23k 31/02
U.S. Cl. 29—477.3                                                7 Claims

ABSTRACT OF THE DISCLOSURE

The method of forming a threaded tube wherein a wire is wound on a mandrel to form a tight helix, the helically wound wire is then removed from the mandrel and is heated to cause a fusing of adjacent convolutions, whereby to form an integral threaded tube.

BACKGROUND OF THE INVENTION

Field of the invention

This invention relates to a method of forming a threaded tube.

Description of the prior art

Threaded tubes have heretofore been formed by mechanical operations such as tapping, turning on a lathe, and so forth. It has also been suggested to form a threaded tube by winding a wire in a tight helix onto a hollow tube and then brazing the wound wire to the surrounded tube to form a threaded tube made up of both components.

SUMMARY

The present invention is directed to a novel method of making threaded tubes wherein a wire, preferably of triangular cross-section, is wound onto a mandrel, preferably the mandrel of a coil forming machine, to form a tight helix wherein adjacent convolutions are in contact with one another. After formation of the tightly helically wound coil, the coil is removed from the mandrel and is heated, preferably in an induction heating furnace to cause the adjacent convolutions to weld or fuse to one another and thereby form a continuous tube with a threaded surface.

BRIEF DESCRIPTION OF THE DRAWINGS

FIG. 1 is a perspective view of a wire to be employed in forming a threaded tube;

FIG. 2 is a side elevational view showing the wire of FIG. 1 partially wound upon the mandrel of a schematically illustrated coil winding machine;

FIG. 3 is a side elevational view of a completely wound wire;

FIG. 4 is a sectional view taken along the line 4—4 of FIG. 3;

FIG. 5 is a view similar to FIG. 3 showing the wound wire in an induction heating furnace; and FIG. 6 is a view similar to FIG. 4 showing a modified form of tube formed in accordance with the present invention.

DETAILED DESCRIPTION OF THE DRAWINGS

Referring now to the drawings in detail, the tube to be formed in accordance with the present method is formed from an elongated strand 10 here shown to be of triangular cross-section, although other cross-sectional shapes of strand may be employed. Strand 10 is made of a weldable material such as, for example, a ferrous metal, although the invention could be employed with various non-ferrous metals and thermoplastic materials. A steel wire strand is presently preferred.

The triangularly shaped strand 10 is wound onto a mandrel 12 into the form of a tight helix 14. Preferably, the winding operation is performed on a coil winding machine 16 of well known conventional design and in which the mandrel 12 would form a part. As shown in FIG. 2, the flat base 18 of the triangularly sectioned wire 10 is brought into surface-to-surface relation with the mandrel 12 although, as will be noted hereinafter, an opposite disposition may be employed. However, with the surface 18 of wire 10 wound into surface-to-surface relation with the mandrel 12, the apex 20 of the wire 10 will be projecting upwardly from the mandrel 12 whereby to form threads of triangular section. It is to be noted that the coil winding machine 16 is of the type that will form the coil 14 with convolutions 22, 22a, 22b, etc. in engagement with their adjacent convolutions. Thus upon completion of the winding operation as illustrated in FIG. 2, the coil 14 may be removed from the mandrel 12 in the conventional manner of such coil winding machines and will be in the form of a very tightly wound helix as illustrated in FIGS. 3 and 4.

Having now formed the tightly wound helix 14, the helix is removed from mandrel 12 and is placed in a furnace adapted to heat the coil 14 to such a temperature as to fuse or weld the adjacent convolutions 22, 22a, 22b, etc. thereof to their respectively adjacent convolutions along their abutting bases without destroying the triangular configuration of the external thread thereon. Obviously the particular temperature of the induction heating furnace for accomplishing this end will depend upon the nature of the material from which the helical coil 14 is formed. However, such temperature may be readily determined by anyone skilled in the art. The heating step will cause a fusing of the adjacent convolutions at their abutting bases to cause the interior surface of the coil 14, that is the surface 26 made up of the adjacent and abutting base surfaces 18 of the various windings 22, 22a, 22b, etc. into which the wire 10 has been formed, to weld together and thus form a continuous, smooth surface 26.

While the heating step above described can be performed in a number of different types of furnaces, I have found that it is most efficiently performed in an induction heating furnace and that is the presently preferred form of furnace for causing the welding of the adjacent convolutions of the tube 14.

While the tube 14 and the method of making it as described above results in the threads defined by the apices 20 of the various convolutions extending upwardly, it will be obvious to anyone skilled in the art that the wire 10 could be wound upon the mandrel 12 with the apex of the wire 10 in engagement with the surface of the mandrel 12 and with the base 18 of the wire 10 being disposed outwardly of the mandrel 12, as in the form shown in FIG. 6. Having performed the winding operation in such a manner, a tube 30 will result which when welded along the abutting edges of the externally disposed base surfaces 18 will form a continuous, internally threaded tube in precisely the same manner as the externally threaded tube heretofore described.

It will be appreciated that while a triangularly cross-sectioned wire 10 is the presently preferred form of wire for practicing the present invention, other configurations can be employed without departing from the present invention. Thus, for example, a wire of trapezoidal configuration could be employed if desired.

The present invention is advantageous over the prior art in view of the fact that it can employ well known and readily available coil winding equipment which is adapted to wind the tight helixes 14 at very low cost. The rapidity with which the coils 14 are formed can be matched in the welding step by an induction heating furnace whereby to yield an extremely high volume, low cost process for producing a threaded tube that will have threads of substantially any desired form and pitch depending upon the choice of the wire 10 from which the product is manufactured. In this connection, it will be understood that the pitch of the thread is to a large part dependent upon the dimension of the base 18. The depth of the thread is controllable by the altitude of the cross-section of the wire 10.

While I have herein shown and described the preferred form of the present invention and have suggested modifications therein, other changes and modifications may be made therein within the scope of the appended claims without departing from the spirit and scope of this invention.

What I claim is:

1. A method of forming a threaded tube, comprising the steps of winding on a mandrel an elongated strand into a tight helix wherein adjacent convolutions are in edge-to-edge abutting engagement with one another, then removing said tight helix from said mandrel, and then heating said tight helix to fuse said adjacent convolutions to one another.

2. The method of claim 1, wherein said mandrel is the mandrel of a coil winding machine and the wrapping of said strand is performed by said machine.

3. The method of claim 1, wherein said strand is of triangular cross-section.

4. The method of claim 3, wherein said strand is wound with the edges defined by the base of said triangular cross-section being in said abutting relation and the apex thereof being directed outward away from the longitudinal axis of said helix.

5. The method of claim 3, wherein said strand is wound with the edges defined by the base of said triangular cross-section being in said abutting relation and the apex thereof being directed toward the longitudinal axis of said helix.

6. The method of claim 1, wherein said heating step is performed in an induction heating furnace.

7. The method of claim 2, wherein said strand is a ferrous wire strand of triangular cross-section, and wherein said heating step is performed in an induction heating furnace.

References Cited

UNITED STATES PATENTS

| | | | |
|---|---|---|---|
| 776,737 | 12/1904 | Greenfield | 29—456 |
| 1,760,039 | 5/1930 | Bundy | 29—456X |
| 2,210,353 | 8/1960 | Barnes | 29—456 |
| 2,442,446 | 6/1948 | Wallace | 29—456X |
| 2,708,306 | 5/1955 | Lampton | 29—456X |
| 3,313,172 | 4/1967 | Ulrich | 29—456X |
| 3,377,696 | 4/1968 | Darrow | 29—498X |
| 1,942,304 | 1/1934 | Mylting | 29—477.3X |
| 2,154,942 | 4/1939 | Karmazin | 29—477.3X |
| 2,216,606 | 10/1940 | Taylor | 29—477.3 |
| 2,288,094 | 6/1942 | Karmazin | 29—477.3 |
| 3,432,914 | 3/1969 | Huck | 29—477.3 |

JOHN F. CAMPBELL, Primary Examiner

R. B. LAZARUS, Assistant Examiner

U.S. Cl. X.R.

29—477, 477.7